(12) United States Patent
Brandmeier et al.

(10) Patent No.: US 8,532,883 B2
(45) Date of Patent: Sep. 10, 2013

(54) DEVICE FOR DETECTING THE CHARACTERISTICS OF AN IMPACT INTO A MOTOR VEHICLE

(75) Inventors: Thomas Brandmeier, Wenzenbach (DE); Michael Feser, Barbing (DE); Susanne Jacob, Pfaffenhofen (DE); Jens Paggel, Abensberg (DE); Sigrid Saulich, Ingolstadt (DE); Paul Spannaus, Ingolstadt (DE)

(73) Assignees: Continental Automotive GmbH, Hannover (DE); Audi Aktiengesellschaft, Ingolstadt (DE)

( * ) Notice: Subject to any disclaimer, the term of this patent is extended or adjusted under 35 U.S.C. 154(b) by 241 days.

(21) Appl. No.: 12/989,300

(22) PCT Filed: Mar. 20, 2009

(86) PCT No.: PCT/EP2009/053318
§ 371 (c)(1),
(2), (4) Date: Dec. 3, 2010

(87) PCT Pub. No.: WO2009/130097
PCT Pub. Date: Oct. 29, 2009

(65) Prior Publication Data
US 2011/0071733 A1 Mar. 24, 2011

(30) Foreign Application Priority Data
Apr. 22, 2008 (DE) .......................... 10 2008 020 186

(51) Int. Cl.
*B60R 22/00* (2006.01)
*B60K 28/10* (2006.01)
*B60T 7/22* (2006.01)

(52) U.S. Cl.
USPC .................. 701/47; 701/45; 701/46; 180/274

(58) Field of Classification Search
USPC ........................... 701/47; 180/274; 280/735
See application file for complete search history.

(56) References Cited

U.S. PATENT DOCUMENTS

| 5,445,412 A | * | 8/1995 | Gillis et al. | 280/735 |
|---|---|---|---|---|
| 7,039,557 B2 | | 5/2006 | Mayer et al. | |
| 7,137,472 B2 | * | 11/2006 | Aoki | 180/274 |
| 7,395,896 B2 | * | 7/2008 | Gerlach et al. | 180/274 |

(Continued)

FOREIGN PATENT DOCUMENTS

| DE | 3736294 A1 | 5/1989 |
|---|---|---|
| DE | 4341645 C2 | 4/1996 |
| DE | 10034524 A1 | 1/2002 |
| DE | 10144076 A1 | 3/2003 |

(Continued)

*Primary Examiner* — Thomas Tarcza
*Assistant Examiner* — Tyler J Lee
(74) *Attorney, Agent, or Firm* — Laurence A. Greenberg; Werner H. Stemer; Ralph E. Locher

(57) ABSTRACT

A device for the detection of the characteristics of an impact into a motor vehicle includes at least one signal generating unit for generating a defined acoustic impulse sequence depending on the speed of the impact, particularly a structure-borne acoustic impulse sequence due to a deformation of a chassis component of the motor vehicle. The acoustic impulse sequence is generated by way of a mechanical activation of the signal generating device caused by the deformation. A sensor system is disposed to detect the defined acoustic impulse sequence. An analysis unit analyzes the signals supplied by the sensor system such that information can be supplied on the characteristics of the impact.

15 Claims, 3 Drawing Sheets

(56) References Cited

U.S. PATENT DOCUMENTS

| | | | |
|---|---|---|---|
| 7,539,569 B2 * | 5/2009 | Baur et al. ................. | 701/45 |
| 2005/0049835 A1 | 3/2005 | Mayer et al. | |
| 2006/0149449 A1 | 7/2006 | Baur et al. | |
| 2006/0229785 A1 | 10/2006 | Baur et al. | |
| 2009/0102674 A1 | 4/2009 | Ohl et al. | |
| 2011/0015829 A1 * | 1/2011 | Mack et al. ................. | 701/47 |

FOREIGN PATENT DOCUMENTS

| | | |
|---|---|---|
| DE | 10245780 A1 | 4/2004 |
| DE | 102004034877 A1 | 2/2006 |
| DE | 102004049380 A1 | 4/2006 |
| DE | 102006026879 A1 | 12/2007 |
| WO | 2005056346 A2 | 6/2005 |
| WO | 2006008298 A1 | 1/2006 |

* cited by examiner

DEVICE FOR DETECTING THE CHARACTERISTICS OF AN IMPACT INTO A MOTOR VEHICLE

BACKGROUND OF THE INVENTION

Field of the Invention

The invention relates to a device for detecting the characteristics of an impact into a motor vehicle.

Rapid detection of an impact into the motor vehicle is of great significance in the development of occupant protection systems, such as airbag systems or seat belt tensioners for example. For efficient protection of the occupants of the motor vehicle it is not only necessary to detect that an impact (crash) is taking place but also to classify said impact. New occupant protection systems, so-called smart airbag systems, also need information about the severity of the impact. As part of the classification the type of impact (side impact or frontal collision with or without coverage etc.) is determined, in order to activate an optimum restraint system for protection. The direction of the impact on the motor vehicle is generally determined with acceleration, pressure and structure-borne sound sensors. The structure-borne sound is created on impact by the deformation of elements of the bodywork (e.g. tears, breaks and distortions) of the motor vehicle.

Although the use of structure-borne sound sensors has great advantages in the determination of information about the characteristics of the impact, there is the problem of the origin of the structure-borne sound being a function of the geometry and the materials. Thus an algorithm must be adapted accordingly for analyzing the structure-borne sound signals and for determining information about the characteristics of the impact. It is therefore only possible with difficulty to fully utilize the structure-borne sound sensing performance to the maximum extent for all vehicles. The necessary information for determining the characteristics of the impact and for optimum control of the occupant protection systems can thus only be provided with time-consuming and cost-intensive calibration work, adaptation of the vehicle structure and also additional sensors if necessary.

BRIEF SUMMARY OF THE INVENTION

The object of the present invention is thus to specify a device for detection of the characteristics of an impact into a motor vehicle which makes it possible to originate, determine and analyze the signals in a more simple manner.

This object is achieved by a device for detection of the characteristics of an impact into a motor vehicle with the features as claimed. Advantageous embodiments emerge in each case from the dependent claims.

The invention creates a device for detection of the characteristics of an impact into a motor vehicle. The device comprises at least one signal generation unit for generating a defined acoustic impulse sequence depending on the speed of the impact, particularly a structure-borne acoustic impact sequence, as a result of a deformation of a bodywork component of the motor vehicle, with the acoustic impulse sequence being generated by a mechanical actuation of the signal generation unit caused by the deformation. The device further comprises a sensor system for detecting the defined acoustic impulse sequence as well as an analysis unit for analyzing the signals delivered by the sensor system, so that information can be provided about the characteristics of the impact.

The inventive device makes possible the "active" and defined generation of acoustic impulses which can be detected more easily by comparison with structure-borne sound signals generated by the deformation of bodywork components. The explicit generation of the acoustic impulses or the acoustic impulse sequence respectively enables parts of the vehicle to be acoustically decoded and analyzed in the event of a crash. As well as detection of the actual impact, this enables the intensity and further information to be determined in a simple manner.

The generation of the acoustic impulses and their analysis by the signal generation unit makes it possible to relocate development and calibration effort during the application of occupant protection systems to the vehicle construction. The device simultaneously has the advantage that robustness is increased since no interpretation of structure-borne sound signals and the like is necessary any longer. Instead the analysis unit "waits" for a specific, explicitly-generated acoustic impulse sequence in order to then control the corresponding occupant protection systems with a predefined pattern. A part of the detection of the type of impact and the severity of the impact is then undertaken in the structure of the vehicle itself. Overall this produces a great improvement in performance as well as a saving in sensors. In addition the time until detection and analysis of the impact can be reduced. It is also of particular advantage that the determination of the relative speed, which forms the basis for all algorithms for controlling occupant protection means, is able to be directly determined and processed from the acoustic impulse sequence generated by the signal generation unit.

Expediently the acoustic impulses generated by the at least one signal generation unit and defined by the structure of the signal generation unit are generated independently of structure-borne sound signals which arise from the deformation of the bodywork component. The sensor system, as well as the downstream analysis unit, thus only have to "hear" the acoustic impulses output by the signal generation unit or the acoustic impulse sequence produced from these impulses. The further structure-borne sound signals generated during a deformation of the bodywork components can optionally be processed by the analysis unit.

In accordance with a further expedient embodiment the acoustic impulses generated by the at least one signal generation unit are such that they are able to be identified by the sensor system from a signal mixture comprising the structure-borne signals generated by the bodywork structure and the acoustic impulses. This is made possible by the constructional design of the signal generation unit so that the frequencies emitted when the unit is activated can be set almost as required. Since the structure-borne acoustic signals generated as part of the deformation of the bodywork component and the frequencies generated in such cases are known, the acoustic impulses generated by the signal generation unit can be generated in another frequency range so that these are able to be detected by the sensor system in an especially simple manner.

Expediently a signal generation unit is provided in each case on the left-hand side and the right-hand side of the vehicle. This makes it possible to detect the direction of the impact. With different coordination or design of the signal generation units on the left-hand side and the right-hand side of the vehicle an angle detection can also be realized, in which case only a single, e.g. centrally-arranged sensor, especially a structure-borne sound sensor, is needed for making the distinction.

Expediently the least one signal generation unit is integrated into a typical accident damage element or arranged on a typical accident damage element, with the typical accident damage element connecting a flexible cross member of a fender to a longitudinal member of the vehicle. The arrangement of the signal generation unit in the typical accident damage element is advantageous since the latter deforms in the event of an impact and the generation of the acoustic impulse sequence can be realized in a simple manner in this way. In addition the signal generation unit can be integrated into the typical accident damage element in a simple manner and can be replaced in the event of damage.

In the first variant the at least one signal generation unit has a plurality of structure-borne sound generating elements which, depending on the speed of the deformation, are able to be activated in turn by a plunger able to be moved relative to the plurality of structure-borne sound generating elements, with an acoustic impulse being generated on activation in each case. The elements generating the structure-borne sound can be activated as a function of speed in an early phase of the impact. To activate a respective element generating structure-borne sound the element's breakage or deformation is used.

To generate the acoustic impulse sequence, which is encoded in accordance with an expedient embodiment, the elements generating structure-borne sound are arranged at defined distances from one another. The elements generating structure-borne sound can be arranged equidistant in relation to one another for example. Arrangement in groups equidistant from one another in each case but at different distances for example is likewise conceivable. The structure-borne sound-generating elements of different groups can also be arranged equidistantly from one another in each case, with however the distance between two respective groups differing from the equidistance. This allows the relative speed between the parties involved in the collision or the speed of the impact to be determined in a simple manner.

A force is applied to the elements generating the structure-borne sound during the impact by the plunger so that these elements are gradually activated (e.g. break) and in doing so generate an acoustic impulse in each case. With equidistant arrangement the frequency is proportional to the speed of the impact. The encoding of the acoustic impulse sequence can be realized by the arrangement of the sound-generating elements, as is usual for example in the so-called Barker code in radar technology. This enables the acoustic impulse sequence excited from the structure-borne acoustic signals (so-called crash noise) to be identified, through which a secure determination of the differential speed between the motor vehicle and the impact object is possible.

The sound-generating elements are formed in accordance with one embodiment by bolts, screws, pins or remodeled material sections made of a hard, brittle material which will be broken by the plunger moved by the deformation relative to the elements. To activate the respective elements generating the structure-borne sound a relative movement of the plunger and the elements generating the structure-borne sound in relation to one another is necessary. In such cases it is up to the person skilled in the art to select whether the plunger moves towards the elements generating the structure-borne sound during a deformation or vice versa.

In accordance with an alternative embodiment the elements generating the sound are formed by projections arranged like the teeth of a comb or by remodeled material of the signal generation unit, which are able to be moved by the deformation relative to the plunger or a barb and are able to be deflected and/or excited into a vibration by engaging with the plunger or with the barb. In this case the projections can be deformed by the plunger or barb moved by the deformation. As an alternative, the projections can be moved by the deformation relative to a permanently supported plunger or barb and in doing so can be deflected or excited into vibration.

In this especially preferred embodiment the plunger is supported movably on the typical accident damage element and lies with its first end on the flexible cross member or is connected to the latter so that deformation of the flexible cross member in the direction of the typical accident damage element results in the movement of the plunger relative to the typical accident damage element while activating the structure-borne sound generating elements. An inventive device designed in this way has the advantage that the signal generation unit can be provided in a space-saving and compact manner in the motor vehicle. In particular all components necessary for generating the acoustic impulse sequence are arranged inside the flexible cross member and the typical accident damage element.

In accordance with an alternate embodiment the signal generation unit is embodied by a typical accident damage element and/or a flexible cross member of a fender connected to the typical accident damage element. The signal generation unit thus does not represent an additional component but is constructively integrated into existing components of a motor vehicle.

In accordance with an actual embodiment the typical accident damage element and/or the flexible cross member have a honeycomb structure featuring sections with honeycombs of different sizes, with the honeycombs able to be activated by their deformation or breakage and an acoustic impulse sequence dependent on the speed of the impact able to be generated by their activation, which is dependent on the sectional size of the honeycombs. The honeycomb structure can be formed by an aluminum foam for example of which the pore density and thus the honeycomb size can be controlled in a simple manner during the manufacturing process. As well as their ability to absorb large amounts of energy, the honeycombs deformed during a deformation generate characteristic acoustic impulses which can be detected and analyzed in an inventive manner.

As an alternative the typical accident damage element and/or the flexible cross member have a laminate structure which is able to be activated by delamination as a result of the external force acting on it, with an acoustic impulse or a structure-borne acoustic impulse dependent on the deformation of the speed able to be generated during activation. An acoustic impulse sequence during the deformation of the typical accident damage element and/or of the flexible cross member can be generated by the two structural components of the motor vehicle having a laminated structure with sections of different densities of the glass fibers, which generate acoustic impulses of different frequency during delamination. A laminated structure is especially to be understood as a fiber compound material, e.g. made from CFC (carbon fiber-reinforced composite materials).

In accordance with a further advantageous embodiment the arrangement of the elements generating the structure-borne sound or the embodiment of the signal generation unit is different on the left-hand side and the right-hand side of the motor vehicle. As already explained above, this allows a distinction to be made as to the impact side and allows the angle of impact to be detected.

In addition to the detection of the impact side, the inventive device makes it possible to determine the relative speed of the other party involved in a collision. With a corresponding constructive embodiment of the signal generation unit the mass of the impacting object as well as the rigidity of the impacting object can also be determined. In the latter case the signal generation unit is integrated into the motor vehicle such that this unit is only activated as from a specific minimum rigidity and/or mass.

The invention will be explained in greater detail below on the basis of a number of exemplary embodiments in the drawings. The figures show:

DESCRIPTION OF THE INVENTION

Figure 1:
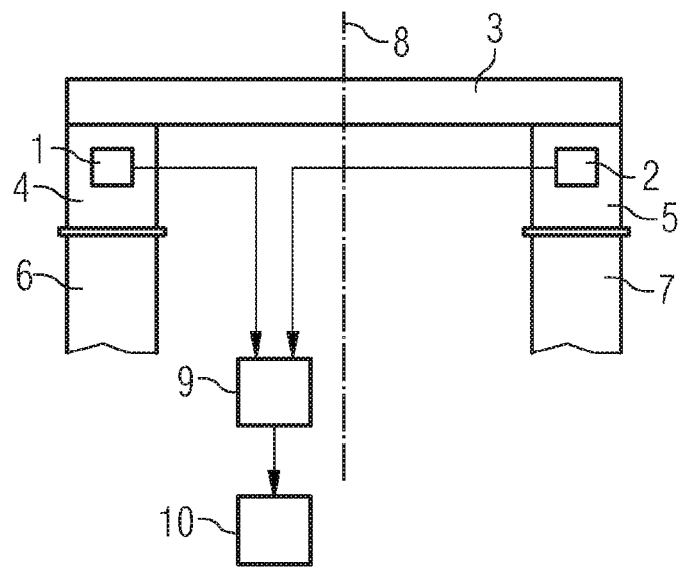
FIG. 1 a schematic diagram of an inventive device for detecting the characteristics of an impact into a motor vehicle, and FIG. 2 through 11 different exemplary embodiments of a signal generation device arranged in an inventive device.

FIG. 1 shows a schematic diagram of an inventive device for detecting the characteristics of an impact into a motor vehicle. Shown in an overhead view are a flexible cross member 3 of a fender which is arranged symmetrically in relation to a longitudinal vehicle axis 8 and for example embodies the front of a motor vehicle. The flexible cross member 3 is mechanically connected in a known way at its two outer opposite ends via a left-hand and right-hand typical accident damage element 4, 5 (also called crash boxes) to a respective left-hand and right-hand longitudinal vehicle member 6, 7 of the vehicle bodywork. In a known way the typical accident damage elements 4, 5 serve to absorb part of the impact energy during an impact between a motor vehicle and an object, in which case the typical accident damage elements 4, 5 deform. The typical accident damage elements 4, 5 can be screwed, welded or connected by means of a plug-in connection to the flexible cross member.

In each of the typical accident damage elements 4, 5 a signal generation unit 1 or 2 is provided in accordance with the invention. The signal generation units 1, 2 described in detail below serve to generate a defined acoustic impulse sequence as a function of the speed of the impact, especially a structure-borne acoustic impulse sequence as a result of a deformation of the flexible cross member or of the respective typical accident damage element 4, 5. The acoustic impulse sequence is caused by a mechanical actuation of the signal generation unit caused by the deformation. The acoustic impulse sequences generated by the signal generation units 1, 2 are picked up by a sensor system 9. To this end, the sensor system 9 can comprise one or more structure-borne sound sensors or sensors for detection of frequencies in the audible range. Coupled to the sensor system 9 is an analysis unit 10 which serves to evaluate the signals delivered by the sensor system 9 in order to determine the desired information about the characteristics of the impact and if necessary to activate an occupant protection system not shown in the figure.

In a variant differing from the exemplary embodiment of FIG. 1 the signal generation units 1, 2 can also be provided in or on other components of the bodywork of the motor vehicle. For example one or more of the signal generation units 1, 2 can be provided in the area of the flexible cross member 3 and/or the longitudinal vehicle member 6, 7. In principle it is expedient to arrange the inventive signal generation unit in the motor vehicle such that a deformation caused by an impact leads with as little delay as possible to the generation of the acoustic impulse sequence.

FIGS. 2 to 11 show different forms of embodiment of a signal generation unit 1, as can be employed in the arrangement shown and described in FIG. 1.

Figure 2:
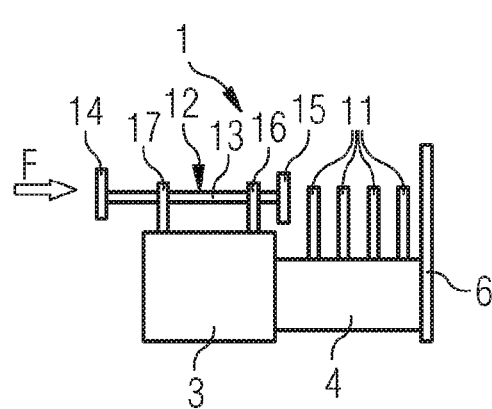

FIG. 2 shows a side view of a first variant of the inventive signal generation unit 1 arranged on the flexible cross member 4. A number of sound-generating elements 11 are provided on the upper side of the flexible cross member 4. The structure-borne sound generating elements 11 can typically be formed by bolts, screws or pins. Preferably they consist of a hard, brittle material. A plunger 12 is supported by two bearings 16, 17 on the upper side of the flexible cross member 3. The plunger 12 comprises a shaft 13 which is guided by the bearings 16, 17. On the end facing away from the structure-borne sound-generating elements 11 the shaft 13 is provided with an impact plate 14. A corresponding, optional impact plate 15 is also arranged in this exemplary embodiment on the end facing towards the structure-borne sound-generating element 11.

If a force F produced by a deformation acts on the fender, the plunger 12 is pushed in the direction of the arrow in the direction of the structure-borne sound-generating element 11, whereby said element is destroyed because of its material and its rigid attachment to the typical accident damage element 4. During destruction of each element 11, by breaking for example, an acoustic impulse is generated which is able to be detected by the sensor system 9. The structure-borne sound is conducted by the transmission path typical accident damage element 4, longitudinal vehicle member 6 through to the sensor system 9 which is typically arranged on the longitudinal vehicle member 6 or on a centrally arranged motor vehicle tunnel.

Consecutive acoustic impulses are generated by the chronologically successive destruction of the structure-borne sound-generating elements 11, so that an acoustic impulse sequence is produced which corresponds to the speed of the impact. With an equidistant arrangement of the structure-borne sound-generating elements 11 the frequency of the acoustic impulses is proportional to the speed of the impact.

The relative spacing of two adjacent structure-borne sound-generating elements 11 enables an encoding to be provided, as is used for example in radar technology with the known Barker codes. The acoustic impulse sequence is able to be differentiated from the crash noise in the simple manner which results from the deformation of the flexible cross member 3, of the typical accident damage element 4 and if necessary of the longitudinal vehicle member 6. On the basis of the acoustic impulse sequence the differential speed of the two parties involved in the collision can be securely determined.

If the structure-borne sound-generating elements 11 in the signal generation unit 1 of the left-hand typical accident damage elements are arranged in a different way than in the signal generation unit 2 provided in the right-hand typical accident damage element, a simple distinction can be made as to whether the impact is occurring on the left-hand side or right-hand side of the motor vehicle. In addition an angular detection can also be realized.

Figure 3:
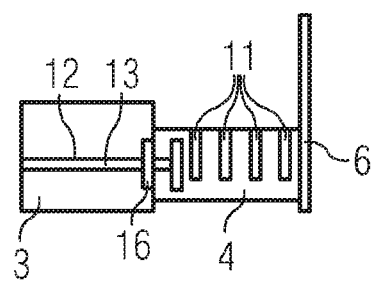
Figure 9:
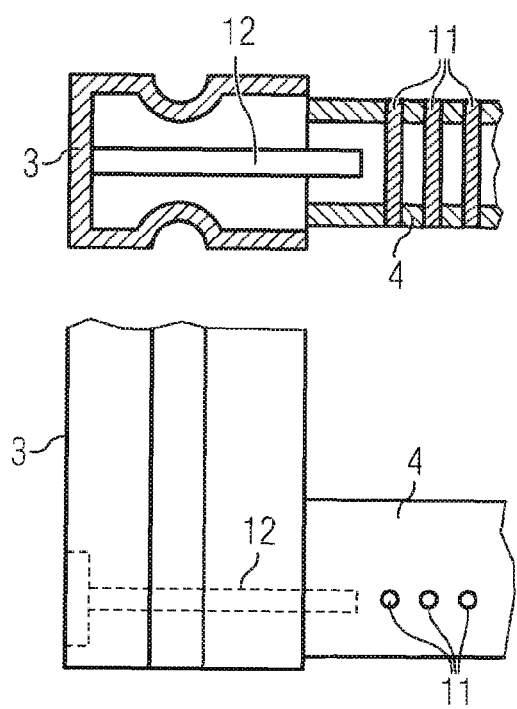

FIG. 3 shows an embodiment variant in which the structure-borne sound-generating elements 11 are arranged inside the typical accident damage element 4. In this case the structure-borne sound-generating elements 11 are only attached on one side to the upper side of the typical accident damage element 4. The plunger 12 is attached by its side facing away from the structure-borne sound-generating elements 11 to the flexible cross member 3 or rests against the latter. Furthermore the plunger 12 is supported by a bearing 16 on the flexible cross member 3 or the typical accident damage element 4 in a movable manner. A further related variant is shown in FIG. 9 which only differs in that the structure-borne sound-generating elements 11 are fixed between or attached to two opposite side surfaces of the typical accident damage element 4. FIG. 9 shows the arrangement of the signal generation unit 1 in the upper half of the figure in a side view and in the lower half of the figure in a view from above. With the variants shown in FIG. 3 and FIG. 9 there is a relative movement of the plunger 12 in the direction of the structure-borne sound-generating elements 11 by a deformation of the flexible cross member 3 and/or of the typical accident damage element 4.

Figure 4:
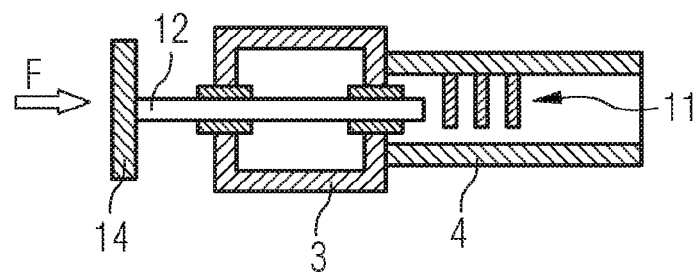

A more rapid detection of the impact of an object on the motor vehicle is possible with the arrangement shown in FIG. 4, in which the end of the plunger 12 facing away from the structure-borne sound-generating elements 11 protrudes from the flexible cross member 3 and typically rests directly on the outer skin of a fender not shown in the figure. Even with a small deformation of the fender the plunger 12 is moved because of a force F acting on its impact plate 14 in the direction of the typical accident damage element 4, in which case shearing or breaking of the structure-borne sound-generating elements 11 arranged behind one another occurs.

Figure 6:
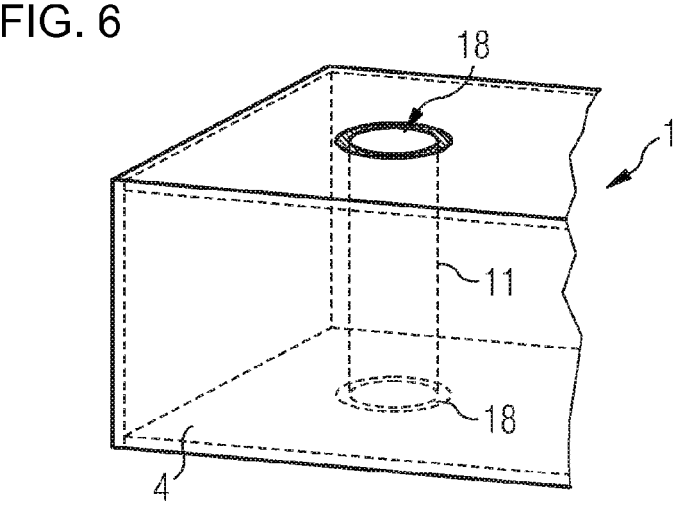
Figure 7:
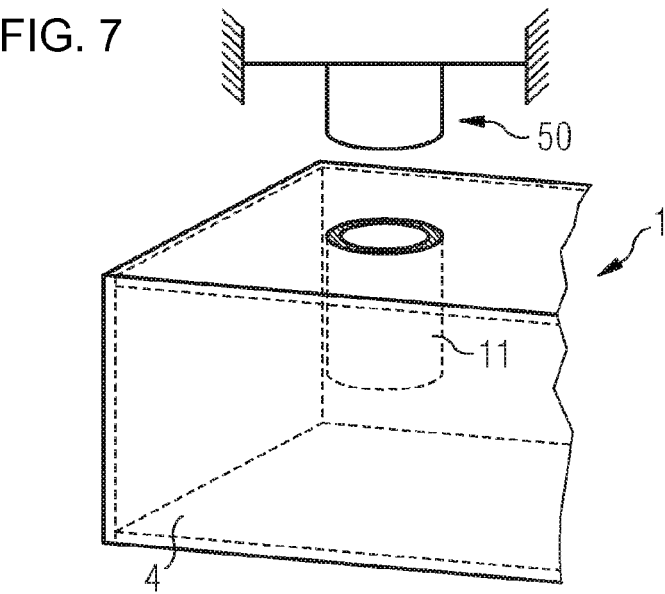

The structure-borne sound-generating elements 11 can, if said elements are embodied as in the previously explained exemplary embodiments as bolts or the like, be connected to the opposite sides of the typical accident damage element 4 (FIG. 6). As an alternative it is possible to make cylindrical projections with a deep drawing tool 50 in the typical accident damage element 4 (FIG. 7). The structure-borne sound-generating element 11 which is formed by a hollow cylinder is then not activated by breaking or shearing, but by deformation, with a characteristic signal impulse being output in this situation.

Figure 5:
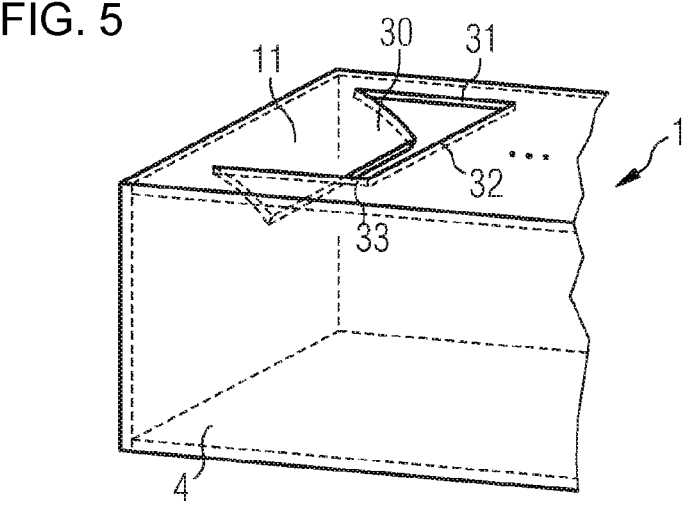

An alternately-embodied element generating structure-borne sound is shown in FIG. 5. In this embodiment variant punched edges 31, 32, 33 are made in a main surface of the typical accident damage element 4 for example, which are arranged approximately in the shape of a cup in relation to one another, to embody an element 11 generating structure-borne sound. A material remodeling tool is used to bend a material section 30 inwards as a type of tongue for example. In a corresponding manner a number of such material sections 30 can be arranged behind one another, with the respective material sections 30 being deformed by a plunger not shown in FIG. 5 during a deformation of a motor vehicle, with the desired acoustic impulses once again being generated in each case. The advantage of this embodiment variant is its ability to be manufactured simply and at low cost.

Figure 8:
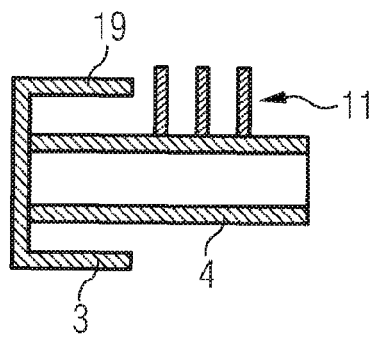

FIG. 8 shows a further embodiment variant in which a plunger for destroying the structure-borne sound-generating elements 11 in the form of bolts, screws or pins can be dispensed with. The function of the plunger movable relative to the structure-borne sound-generating elements 11 is taken over by a wall of the flexible cross member 3. As can be easily seen from the cross-sectional diagram depicted in FIG. 8, a flexible cross member 3 has a U-shaped profile, with the typical accident damage element 4 being connected to the section which connects together the arms running in parallel to each other.

Figure 10:
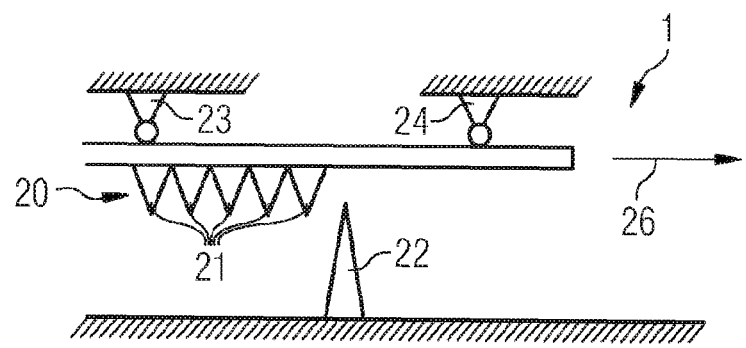

FIG. 10 shows a further exemplary embodiment in which a comb structure 20 with a number of projections 21 arranged in a defined manner behind one another is provided for generating the acoustic impulse sequence. During a deformation a relative movement takes place in relation to a fixed barb 22, which excites the comb structure into a vibration. The comb structure 20 is connected via loose supports 23, 24 to another part of the bodywork. The reference sign 26 indicates the direction of movement of the comb structure in the event of an impact into the motor vehicle. It can be easily seen that the comb structure 20 can also be arranged fixed to a component of the bodywork to generate the acoustic impulse sequence while the barb 22 is moved by the deformation relative to the comb structure 20.

Figure 11:
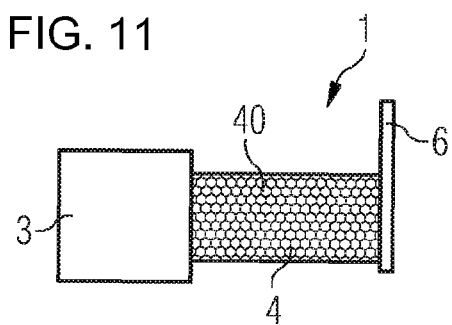

In the exemplary embodiment shown in FIG. 11 the signal generation unit 1 is embodied by the typical accident damage element 4 itself. In this case the typical accident damage element 4 is provided with a honeycomb structure featuring sections with honeycombs of different sizes. The honeycombs are able to be activated by deformation or breakage, in which case an acoustic impulse sequence dependent on the speed of the impact is generated during their activation which is dependent on the size of the honeycomb sections. The honeycomb structure can be formed for example by an aluminum foam of which the pore density and thereby the honeycomb size can be selected in a simple manner.

In a further alternate embodiment at least sections of the honeycomb structure can also be provided in the flexible cross member 3 and/or in the longitudinal vehicle member 6. As an alternative the honeycomb structure can also be exclusively provided at least in sections in the flexible cross member 3 and/or on the longitudinal vehicle member 6.

In a further form of embodiment not shown in further detail in a separate figure the flexible cross member 3 and/or the typical accident damage element 4 can be formed from a laminate, e.g. a fiber compound material. A carbon fiber-reinforced compound material CFC might typically be used as a laminate. The characteristic structure vibrations, i.e. the acoustic impulse sequence is generated by delamination of the laminate.

The principle underlying the invention consists of integrating structure-borne sound generating elements into the structure of the motor vehicle which are activated in the early phase of an impact as a function of the speed of the impact. These signal generation elements generate definable (structure-borne) acoustic signals when deformed or destroyed. Because of the defined arrangement or spacing of the elements generating structure-borne sound to each other a number of detectable acoustic impulse sequence can be generated in the event of an impact. With an equidistant arrangement the impulse sequence is proportional to the speed of the impact.

The arrangement of the elements generating the structure-borne sound relative to one another enables an encoding to be provided. The different embodiment of the signal generation unit on the left-hand side and the right-hand side of the bodywork of the motor vehicle enables the impact side and even an angle of impact to be detected.

By suppressing the generation of the acoustic impulse sequence a simple hiding of the "AZT detection" loading condition can be provided.

Of particular advantage is the situation that the development and calibration outlay for occupant protection systems, especially airbags, is lastingly simplified or reduced by explicit design of the vehicle construction or small number of bodywork constructional elements. At the same time the robustness of the sensor system of an occupant protection system is enhanced, since explicitly generated acoustic impulse sequences are detected and evaluated.

The invention claimed is:

1. A device for detecting the characteristics of an impact into a motor vehicle, comprising
    at least one signal generation unit for generating a defined acoustic impulse sequence depending on a speed of the impact, the acoustic impulse sequence being due to a deformation of a bodywork component of the motor vehicle and being generated by a mechanical actuation of said signal generation unit caused by the deformation;
    a sensor system configured to detect the defined acoustic impulse sequence and to generate sensor signals; and an analysis unit configured to receive and analyze the sensor signals delivered by said sensor system and to output information about the characteristics of the impact;

wherein said at least one signal generation unit includes a plurality of elements for generating structure-borne sound, capable of being activated in turn depending on a speed of the deformation by a plunger that is movably disposed relative to said plurality of elements for generating the structure-borne sound, with an acoustic impulse being generated in each case on an activation thereof.

2. The device according to claim 1, wherein the impulse sequence is a structure-borne acoustic impulse sequence.

3. The device according to claim 1, wherein the acoustic impulses generated by said at least one signal generation unit and defined by a structure of said signal generation unit are generated independently of structure-borne acoustic signals that arise from the deformation of the bodywork component.

4. The device according to claim 3, wherein the acoustic impulses generated by said at least one signal generation unit are such that the impulses are identifiable by said sensor system from a mixed signal composed of the structure-borne acoustic signals generated by the bodywork structure and the acoustic impulses.

5. The device according to claim 1, wherein said signal generation unit includes a signal generation unit disposed on a left-hand side of the motor vehicle and a signal generation unit disposed on a right-hand side of the motor vehicle.

6. The device according to claim 1, wherein said a least one signal generation unit is integrated into, or disposed on, a conventional accident damage element, with the conventional accident damage element connecting a flexible cross member of a fender to a longitudinal vehicle member of the motor vehicle.

7. The device according to claim 1, wherein a breakage or deformation of said structure-borne sound generating element is initiated to cause the activation of a respective said structure-borne sound generating element.

8. The device according to claim 1, wherein said elements for generating structure-borne sound are arranged at defined distances from each other to implement an encoded acoustic impulse sequence.

9. The device according to claim 1, wherein said elements for generating structure-borne sound include bolts, screws, pins or remodeled material sections made from a hard, brittle material that are broken by deformation by said plunger that is moved relative to said elements.

10. The device according to claim 1, wherein said elements for generating structure-borne sound are projections arranged in a comb-shape, and movable by deformation relative to said plunger or a barb and capable to be deflected and/or excited into a vibration by engaging with the plunger or barb.

11. The device according to claim 1, wherein said plunger is movably supported on the conventional accident damage element and rests with a first end on the flexible cross member or is connected to the flexible cross member so that through a deformation of the flexible cross member in a direction of the conventional accident damage element a movement of said plunger relative to the conventional accident damage element with activation of said elements generating the structure-borne sound results.

12. The device according to claim 1, wherein said signal generation unit is embodied by a conventional accident damage element and/or by a flexible cross member of a fender connected to the conventional accident damage element.

13. The device according to claim 12, wherein one or both of the conventional accident damage element or the flexible cross member comprise a honeycomb structure formed with sections of different-sized honeycombs, with said honeycombs being activatable through a deformation or breakage and on activation of which an acoustic impulse sequence is generated which depends on a sectional size of said honeycombs.

14. The device according to claim 12, wherein one or both of the conventional accident damage element or the flexible cross member comprises a laminated structure activatable by delamination as a result of an action of an external force, wherein an acoustic impulse or a structure-borne impulse dependent on the speed is generated by the deformation during activation.

15. The device according to claim 1, wherein said signal generation unit is integrated in, or disposed on, a conventional accident damage element, or said signal generation unit is formed of elements generating a structure-borne sound, and wherein an embodiment of said signal-generation unit is different on a left-hand side of the motor vehicle from a right-hand side of the motor vehicle.

* * * * *